US012679149B2

(12) United States Patent
Mouchet

(10) Patent No.: US 12,679,149 B2
(45) Date of Patent: Jul. 14, 2026

(54) EQUIPMENT FOR AN ELECTRONIC SYSTEM FOR CHECKING THE PRESSURE OF THE TYRES OF A MOTOR VEHICLE

(71) Applicant: ATEQ, Les Clayes sous Bois (FR)

(72) Inventor: Jacques Mouchet, Singapore (SG)

(73) Assignee: ATEQ, Les Clayes sous Bois (FR)

( * ) Notice: Subject to any disclaimer, the term of this patent is extended or adjusted under 35 U.S.C. 154(b) by 109 days.

(21) Appl. No.: 18/576,281

(22) PCT Filed: Jun. 29, 2022

(86) PCT No.: PCT/EP2022/067952
§ 371 (c)(1),
(2) Date: Jan. 3, 2024

(87) PCT Pub. No.: WO2023/280661
PCT Pub. Date: Jan. 12, 2023

(65) Prior Publication Data
US 2024/0149625 A1 May 9, 2024

(30) Foreign Application Priority Data
Jul. 6, 2021 (FR) ........................................ 2107290

(51) Int. Cl.
*B60C 23/04* (2006.01)

(52) U.S. Cl.
CPC ...... *B60C 23/0479* (2013.01); *B60C 23/0447* (2013.01); *B60C 23/0471* (2013.01)

(58) Field of Classification Search
None
See application file for complete search history.

(56) References Cited

U.S. PATENT DOCUMENTS

| | | | |
|---|---|---|---|
| 9,050,862 B2 | 6/2015 | Mouchet | |
| 9,191,627 B1 * | 11/2015 | Reid | B60R 25/305 |
| 10,336,143 B2 * | 7/2019 | Bill | B60C 23/0486 |
| 10,850,715 B1 * | 12/2020 | Decker, Jr. | B60T 8/1708 |
| 10,875,365 B2 | 12/2020 | Mouchet et al. | |
| 10,913,315 B1 * | 2/2021 | Del Olmo | B60C 23/00354 |
| 11,279,183 B2 | 3/2022 | Bout | |

(Continued)

FOREIGN PATENT DOCUMENTS

| | | |
|---|---|---|
| CN | 204309535 U | 5/2015 |
| EP | 3492896 A1 | 6/2019 |

(Continued)

*Primary Examiner* — Fekadeselassie Girma
(74) *Attorney, Agent, or Firm* — Young Basile Hanlon & MacFarlane, P.C.

(57) ABSTRACT

Electronic equipment for use in checking the air pressure of the tires of a motor vehicle and communicating information to an on-board computer of the motor vehicle is disclosed. The equipment includes a device including an internal pressure sensor and a connection means for connecting the device to a valve of a tire to place the internal pressure sensor in communication with the internal air pressure of the tire. In one example, the electronic equipment includes a device having a first case, and the internal air pressure sensor is in a separate second case including the connection means to connect the second case to the valve of the tire. The internal air pressure sensor in the second case is configured to be in communication with the components in the first case of the device.

19 Claims, 2 Drawing Sheets

(56)          References Cited

U.S. PATENT DOCUMENTS

| | | | | |
|---|---|---|---|---|
| 11,400,772 | B2 | 8/2022 | Bout et al. | |
| 2006/0158324 | A1 * | 7/2006 | Kramer | B60C 23/0479 |
| | | | | 340/447 |
| 2008/0093814 | A1 * | 4/2008 | Filippi | B60C 23/006 |
| | | | | 152/418 |
| 2013/0106596 | A1 * | 5/2013 | Mouchet | B60C 23/0472 |
| | | | | 340/445 |
| 2013/0145834 | A1 * | 6/2013 | Mouchet | B60C 23/00 |
| | | | | 141/38 |
| 2013/0282231 | A1 * | 10/2013 | Farr | G01B 11/2755 |
| | | | | 701/1 |
| 2014/0139332 | A1 * | 5/2014 | Mouchet | B60C 23/0479 |
| | | | | 340/442 |
| 2016/0311273 | A1 * | 10/2016 | Zaroor | B60C 23/0474 |
| 2017/0050477 | A1 * | 2/2017 | Fang | B60C 23/0471 |
| 2017/0100970 | A1 | 4/2017 | Hsu et al. | |
| 2017/0136834 | A1 * | 5/2017 | Chong | B60C 23/0433 |
| 2017/0217261 | A1 * | 8/2017 | Mays | B60C 23/0486 |
| 2019/0389257 | A1 * | 12/2019 | Shen | B60C 23/0471 |
| 2020/0062051 | A1 * | 2/2020 | Mouchet | B60C 23/0461 |
| 2020/0391558 | A1 * | 12/2020 | Ghannam | B60C 23/0471 |
| 2021/0023891 | A1 * | 1/2021 | Bill | B60C 23/20 |
| 2021/0162821 | A1 * | 6/2021 | Huard | B60C 23/0479 |
| 2021/0260936 | A1 * | 8/2021 | Bout | B60C 23/0462 |
| 2021/0286385 | A1 * | 9/2021 | Chen | G01L 17/00 |
| 2021/0339583 | A1 * | 11/2021 | Regef | B60C 23/0416 |
| 2022/0144024 | A1 * | 5/2022 | Bout | B60C 23/0479 |
| 2023/0050483 | A1 * | 2/2023 | Bout | B60C 23/0416 |

FOREIGN PATENT DOCUMENTS

| | | | | | |
|---|---|---|---|---|---|
| GB | | 2543851 | A | 5/2017 | |
| WO | WO-2012098268 | A1 | * | 7/2012 | G01L 17/00 |
| WO | WO-2021087391 | A1 | * | 5/2021 | B60C 23/0461 |

* cited by examiner

EQUIPMENT FOR AN ELECTRONIC SYSTEM FOR CHECKING THE PRESSURE OF THE TYRES OF A MOTOR VEHICLE

CROSS-REFERENCE TO RELATED APPLICATIONS

This application is filed pursuant to 35 U.S.C. § 371 claiming priority benefit to PCT/EP2022/067952 filed Jun. 29, 2022, which claims priority benefit to French Patent Application No. 2107290 filed Jul. 6, 2021, the contents of both applications are incorporated herein by reference in the entirety for all purposes.

TECHNICAL FIELD

The present invention relates to the field of tyre pressure monitoring systems (the usual acronym of which is TPMS) of motor vehicles.

BACKGROUND

Indeed, in such systems, the pressure sensors are generally housed in the tyres (or tires) of the vehicle and associated to the on-board computer of the motor vehicle to which said sensors transmit data. The sensor-on-board assembly is thus designated under the term "tyre pressure monitoring system".

Indeed, each pressure sensor is conventionally equipped with a radio frequency transmitter to make it possible to transmit data to the on-board computer. The on-board computer receiving data from the sensors may thus alert the user of the vehicle if one of the tyres were to puncture or deflate, resulting in a risk for their safety. It will also be noted that the pressure sensors may also be equipped with a communication means of the Bluetooth, and more particularly BLE (Bluetooth Low Energy) type, instead of or in addition to another radio frequency transmission means.

However, the pressure sensor associated with the wheel (generally housed inside of it) is not always removable. Thus, changing a wheel implies changing the sensor, the new sensor then no longer being detected or recognized by the on-board computer of the vehicle.

It is therefore necessary, when changing the tyres, to pair (or associate) the sensors housed inside the new tyres with the on-board computer of the vehicle.

This pairing is carried out by means of a dedicated device or apparatus (generally designated under the term "TPMS tool"), this device being configured to activate the pressure sensors, recover and record the relevant data emitted by the sensor, such as the identifier of the sensor, and transmit them, for example by way of an OBD cable, to the on-board computer, so that the latter can detect, and locate the sensors housed inside the newly installed tyres and receive therein the data, in order to warn the user in the event of a pressure drop in one of said tyres.

However, new needs have appeared during the use of such apparatus whether in a garage or also on a line for producing tyres or motor vehicles.

Indeed, it is possible that the motor vehicles do not comprise tyre pressure monitoring systems, and therefore no pressure sensors housed inside the tyres.

Thus, it may be necessary to rapidly measure the pressure of a tyre and to have a suitable apparatus for that.

It may also be necessary to be able to check the pressure of a tyre already housing a pressure sensor, particularly to check that the sensor is working correctly, is correctly positioned, has not drifted, and/or to check that it is not necessary to calibrate it or carry out any maintenance.

SUMMARY

More particularly, the present invention relates to a device or apparatus making it possible to communicate over various frequencies, to program, and/or to pair one or more elements together, such as the tyre pressure sensors with the on-board computer of a vehicle, of said tyre pressure monitoring systems (it will be noted that said device is sometimes called "TPMS valve forcer").

Thus, the present invention is an apparatus for an electronic system for monitoring the pressure of the tyres of a motor vehicle, said apparatus comprising a device which comprises:

- an activation module for activating pressure sensors housed in a tyre;
- a reception means for receiving signals from the pressure sensors;
- an electronic entity configured to store and/or process the data carried by the signals emitted by the sensors;
- a communication means communicating with a remote electronic entity, such as the on-board computer of a motor vehicle, so as to transmit the data from the received signals;
- characterized in that said apparatus comprises an internal pressure sensor and a connection means for connection to a tyre valve, said connection means being configured to connect said internal pressure sensor to the valve of a tyre.

Thus, the invention makes it possible to have a single item of apparatus, on the one hand, for measuring the pressure of a tyre equipped or not with a pressure sensor and, on the other hand, for pairing pressure sensors with the on-board computer of a motor vehicle. This simplifies the task of the operator who does not need to have several items of apparatus and need to learn how to use them, while reducing the costs.

Moreover, it will be noted that "internal pressure sensor" means a pressure sensor dedicated to the apparatus according to the invention, whether it is housed directly inside the device or elsewhere. However, said internal pressure sensor is configured to be in communication with said device of the apparatus according to the invention.

According to a possible feature, said device comprises a reception housing for said internal pressure sensor.

Said internal pressure sensor is for example housed directly inside the device, for example inside a dedicated housing (or a cavity). Said connection means for connection to a tyre valve being configured to connect the internal pressure sensor to the tyre of which it is sought to measure the pressure.

According to another possible feature, said internal pressure sensor is housed inside a case different from said device.

It is advantageous to be able to move the internal pressure sensor away from the device to facilitate the connection and the disconnection of the internal pressure sensor to/from the tyre of which it is sought to measure the pressure value.

According to another possible feature, said internal pressure sensor is integral with the walls of said case.

The fact of securing the internal pressure sensor to the case makes it possible to prevent any movement of the internal pressure sensor inside the case, thus limiting the risk of the sensor becoming damaged by impacts and/or the pressure measurement becoming altered.

According to another possible feature, said connection means is fixed to said case.

Said connection means makes it possible to establish, once that said connection means is connected to the valve of the tyre, an air path between the internal pressure sensor housed in the case and the interior of the tyre.

According to another possible feature, said case (housing the internal pressure sensor) and/or said device comprise mechanical and/or magnetic means for securing the device to the case. The operator may thus easily transport the assembly and separate them only at the time of their use.

According to another possible feature, said case comprises a material transparent to radio frequency waves. Advantageously, the internal pressure sensor comprises a wireless communication means for communicating with the device, for example by radio frequencies or by Bluetooth.

According to another possible feature, said case is made of plastic or polymers.

According to another possible feature, said connection means comprises a connector for a tyre valve.

According to another possible feature, said connection means comprises a tube making it possible to connect the connection means to the case and/or to connect the connection means to the valve of a tyre.

According to another possible feature, said internal pressure sensor of said apparatus is a pressure sensor for an electronic system for monitoring the pressure of the tyres of a motor vehicle. Advantageously, the internal pressure sensor used is a pressure sensor of the type of those housed inside the tyres of motor vehicles for the tyre pressure monitoring systems.

BRIEF DESCRIPTION OF THE DRAWINGS

The invention will be better understood, and other aims, details, features and advantages thereof will become more apparent during the following description of particular embodiments of the invention, given purely by way of non-limiting example, with reference to the appended drawings, wherein.

DETAILED DESCRIPTION

Figure 1:
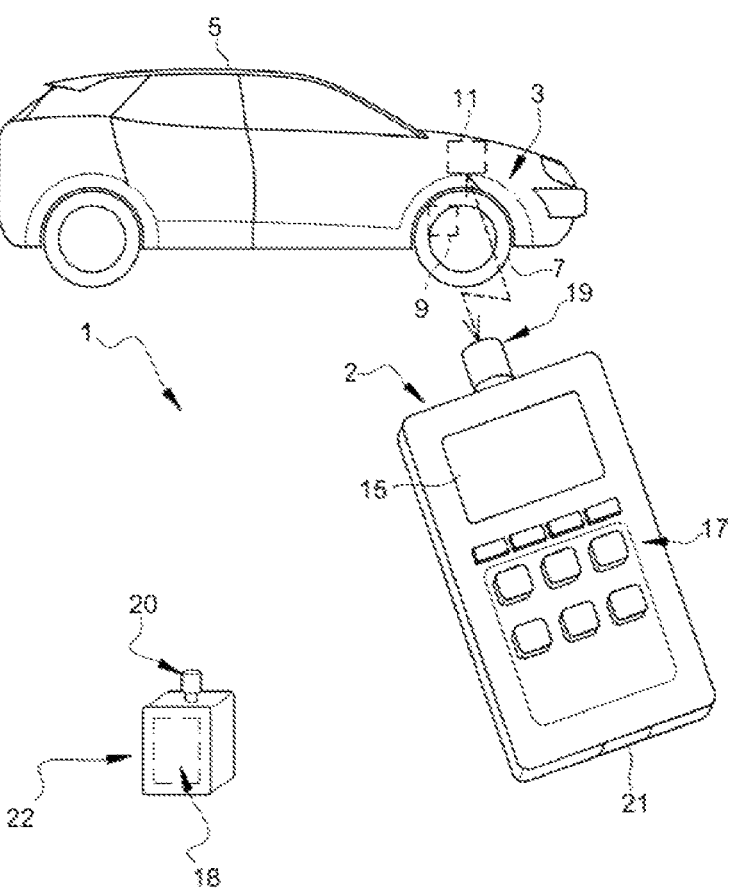
FIG. 1, is a very schematic representation illustrating apparatus for activating pressure sensors of tyres according to the invention.

FIG. 1 is a very schematic representation of apparatus 1 for activating sensors 9, more particularly in the present example of activation apparatus 1 for an electronic system 3 for monitoring the pressure of the tyres of a motor vehicle 5 (said apparatus 1 also able to be designated or referred to under the terms "valve activator" or "valve forcer").

The motor vehicle 5, on the one hand, is equipped with tyres 7 (or tires) in which the sensors 9, such as internal air pressure sensors, are housed, and on the other hand comprises an on-board computer 11 (also called electronic control unit and generally designated under the acronym "ECU").

The apparatus 1 includes a device 2 external to the tire and the motor vehicle which itself comprises a case 13 (known as first case), for example made of plastic, a display device 15, a keyboard 17 and an antenna 19 for selectively emitting a sensor activation signal, as well as an OBD socket 21. Said OBD socket 21 is configured to make it possible for example to connect the device 2 (and therefore the apparatus 1) to the on-board computer 11 of a vehicle, particularly via an OBD cable. In one example the device 2 is a TPMS tool positioned exterior (e.g., external) to the tire and the motor vehicle.

Said apparatus 1 also comprises:

an internal pressure sensor 18, for example a pressure sensor for a motor vehicle tyre pressure monitoring system (also called "TPMS sensor") external to the tire;

a connection means 20 for connection to a tyre valve, said connection means 20 being configured to selectively connect said internal pressure sensor 18 to the valve of a tyre, particularly to enable (e.g., place) the internal pressure sensor 18 to in communication with the air pressure in the tire to measure the air pressure prevailing inside the tyre.

Said apparatus 1 further comprises a case 22, known as second case, different (e.g., physically distinct or physically separated) from the case 13 (and therefore at a distance from the device 2), respectively the second case 22 and the first case 13.

Said second case 22 has (e.g., defines) an internal volume wherein said internal pressure sensor 18 is housed (e.g., positioned in the internal volume). Said connection means 20 is thus attached to the case 22 and makes it possible to connect the internal volume of said case 22, where the internal pressure sensor 18 is housed, to a motor vehicle tyre (particularly to enable the internal pressure sensor 18 to measure the pressure therein).

The second case 22 is thus made of a material transparent to radio frequency waves, so as to enable the internal pressure sensor 18 to wirelessly communicate with the device 2.

Said case 22 is for example made of a plastic or polymer material, the internal pressure sensor 18 being integral with the walls of the case 22, for example by overmoulding the case 22 on the internal pressure sensor 18.

More particularly, said connection means 20 comprises a connector 20a for a tyre valve (more particularly shown in FIG. 2) fixed to the second case 22.

In an alternative embodiment not shown, said connection means 20 also comprises one or more tubes making it possible to connect the connector 20a to said case 22 and/or said connector 20a to the valve of the tyre.

In another alternative embodiment not shown, said second case 22 and/or said device 2 (particularly by means of the first case 13) comprise mechanical and/or magnetic means for securing the device 2 to the case 22. The mechanical and/or magnetic means are for example clips, magnets, of complementary shapes making it possible to lock the cases 13 and 22 to one another, etc.

Figure 2:
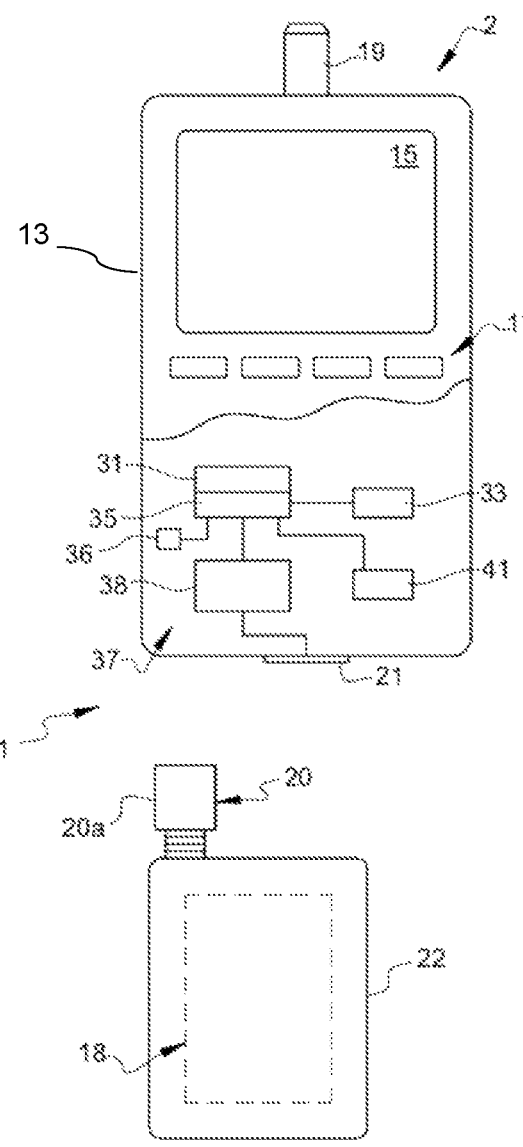
FIG. 2, is an enlarged, partially cut-away front view of the device of FIG. 1.

FIG. 2, for its part, is an enlarged, partially cut-away and detailed front view of the apparatus 1 of FIG. 1.

Said device 2 thus comprises:

at least one sensor activation module 31, such as modules making it possible to generate signals (continuous and/or modulated) for activating sensors, said activation module 31 comprising the antenna 19 that particularly makes it possible to propagate as best as possible said generated signals up to the sensors 9 or 18;

a reception module 33 for receiving signals from the sensors, generally another antenna housed in the case 13 and configured for example to receive signals in a frequency band between 300 and 500 MHz (the sensor emitting a signal after having been activated by said activation module 31);

an electronic entity 35, such as a processor and a memory, configured to store and/or process the data carried by the signals emitted by said sensors 9 or 18 (and received by means of the reception module 33);
a communication means 37 communicating with the on-board computer 11 (e.g., remote electronic entity) of the motor vehicle 5 for transmitting the data from at least one of said sensors 9 (data received by means of signals from said sensors 9).

The communication means 37 is for example an OBD module which comprises a managing circuit 38 for managing the OBD communication and the OBD socket 21 mentioned above. It will be noted that the management circuit 38 may also be integrated into the electronic entity 35.

It will be noted that OBD means all of the OBD modules complying with the OBD, OBD-II, E-OBD, J-OBD, etc., standards.

The device 2 also comprises a battery 41 configured to power the various elements mentioned above.

Moreover, the device 2 may also comprise an additional communication module 36 of the Bluetooth type, particularly of the "Bluetooth Low Energy" type, for communicating with the internal pressure sensor 18 disposed in the case 22 and/or with a pressure sensor 9 housed inside the tyre of the motor vehicle 5.

Moreover, it will be noted that said activation signals are continuous or modulated, electromagnetic signals, emitted by the activation module(s) 31, which have for example a frequency of 125 kHz.

In another alternative embodiment not shown, a cavity or a housing is arranged in the case 13 for housing the internal pressure sensor 18, the connection means 20 for connection to a tyre valve being attached on said case 13, in such a way as to enable, as above, said internal pressure sensor 18 to measure the pressure in a tyre of the motor vehicle 5.

Thus, the invention makes it possible to have a single item of apparatus for monitoring the pressure of motor vehicle tyres and/or for monitoring the correct operation of pressure sensors, already installed, of an electronic system for monitoring the pressure of the tyres of the motor vehicle 5. The invention makes it possible to have a single item of apparatus, on the one hand, for measuring the pressure of a tyre equipped or not with a pressure sensor. The internal pressure sensor is configured to alternately measure the air pressure of a first tire not equipped with a pressure sensor and a second tire that includes a pressure sensor to check that the pressure sensor in the tire is operating properly. On the other hand, the single item of apparatus is useful for pairing pressure sensors with the on-board computer of a motor vehicle. This simplifies the task of the operator who does not need to have several items of apparatus and need to learn how to use them, while reducing the costs.

The invention claimed is:

1. An apparatus for an electronic system for selectively measuring air pressure of a tire of a motor vehicle, said apparatus comprising:
   a device external to the tire and the motor vehicle comprising:
   an activation module configured to selectively activate a pressure sensor housed in the tire;
   a reception means for receiving signals from the pressure sensor;
   an electronic entity configured to at least one of store or process data carried by the signals received from the pressure sensor; and
   a communication means configured to communicate with an on-board computer of the motor vehicle so as to transmit the data from the received signals to pair the pressure sensor with the on-board computer of the motor vehicle;
an internal pressure sensor external to the tire and the motor vehicle, the internal pressure sensor in communication with the device; and
a connection means for connection of the apparatus to a tire valve of the tire, said connection means being configured to selectively connect said internal pressure sensor to the tire valve of the tire and operable to alternately measure an air pressure of the tire when the tire does not include the pressure sensor in the tire or when the tire does include the pressure sensor in the tire to check that the pressure sensor in the tire is operating properly.

2. The apparatus of claim 1, wherein said device further comprises a first case configured to house said internal pressure sensor.

3. The apparatus of claim 1, wherein said internal pressure sensor is housed inside a second case distinct from said device.

4. The apparatus of claim 3, wherein said internal pressure sensor is integral with a wall of said second case.

5. The apparatus of claim 3, wherein said connection means is fixed to said second case.

6. The apparatus of claim 3, wherein at least one of said second case or said device further comprises at least one of mechanical or magnetic means configured for securing the device to the second case.

7. The apparatus of claim 3, wherein said second case comprises a material transparent to radio frequency waves.

8. The apparatus of claim 7, wherein the material for said second case comprises a plastic or polymer material.

9. The apparatus of claim 1, wherein said connection means comprises a connector configured to connect the apparatus to the tire valve.

10. The apparatus of claim 1, wherein said internal pressure sensor comprises a tire air pressure sensor for a tire pressure monitoring system (TPMS) of the motor vehicle.

11. The apparatus of claim 4, wherein said connection means is fixed to the second case.

12. The apparatus of claim 5, wherein at least one of said second case or said device further comprises at least one of mechanical or magnetic means configured for securing the device to the second case.

13. The apparatus of claim 5, wherein said connection means comprises a connector configured to connect the second case to the tire valve.

14. The apparatus of claim 3, wherein the second case is physically separated from the device when the internal pressure sensor measures the air pressure in the tire.

15. An apparatus for an electronic system for selectively measuring air pressure of a tire of a motor vehicle, said apparatus comprising:
   a tire pressure monitoring system (TPMS) tool positioned external to the tire and the motor vehicle comprising:
   an activation module configured to selectively activate a pressure sensor housed in a first tire;
   a reception means for receiving signals from the pressure sensor;
   an electronic entity configured to at least one of store or process data carried by the signals received from the pressure sensor; and
   a communication means configured to communicate with an onboard computer of the motor vehicle so as to transmit the data from the received signals;

an internal pressure sensor external to the tire and the motor vehicle, the internal pressure sensor in communication with the TPMS tool; and a connector configured to selectively connect the apparatus to a tire valve of the tire of the motor vehicle to place the internal pressure sensor in communication with an air pressure of the tire of the motor vehicle, wherein the internal pressure sensor is configured to alternately measure an air pressure of a second tire not including the pressure sensor and measure an air pressure of the first tire including the pressure sensor to check that the pressure sensor in the first tire is operating correctly, and communicate the measured air pressure to the TPMS tool.

16. The apparatus of claim 15, wherein the TPMS tool further comprises a first case positioned external to the tire and the motor vehicle, the first case housing the activation module, the reception means, the electronic entity and the communication means, the apparatus further comprising:

a second case positioned external to the tire and the motor vehicle, the second case different from the first case and physically distinct from the first case, the second case defining an internal volume, wherein the internal pressure sensor is positioned in the internal volume, the second case including the connector configured to selectively connect the second case to the tire valve of the first tire or the second tire to place the internal pressure sensor in communication with the air pressure of the first tire or the second tire, respectively, to measure the air pressure of the first tire or the second tire.

17. The apparatus of claim 16, wherein the internal pressure sensor positioned in the second case comprises a TPMS tire pressure sensor.

18. The apparatus of claim 16, wherein the communication means comprises an OBD socket in the first case configured to connect the TPMS tool to the on-board computer of the motor vehicle to transmit the data received from the signals received from the pressure sensor of the first tire to pair the pressure sensor with the on-board computer of the motor vehicle.

19. The apparatus of claim 16, wherein the connector comprises a tube connected to the second case configured to facilitate connection of the connector to the tire valve.

* * * * *